(12) United States Patent
Gaume et al.

(10) Patent No.: US 10,686,289 B2
(45) Date of Patent: Jun. 16, 2020

(54) CLADDING MATERIAL FOR LASER AMPLIFIER TRANSVERSE OSCILLATION SUPPRESSION

(71) Applicant: University of Central Florida Research Foundation, Inc., Orlando, FL (US)

(72) Inventors: Romain Gaume, Orlando, FL (US); Eric Cunningham, Orlando, FL (US); Shi Chen, Orlando, FL (US)

(73) Assignee: UNIVERSITY OF CENTRAL FLORIDA RESEARCH FOUNDATION, Orlando, FL (US)

( * ) Notice: Subject to any disclaimer, the term of this patent is extended or adjusted under 35 U.S.C. 154(b) by 0 days.

(21) Appl. No.: 16/131,825

(22) Filed: Sep. 14, 2018

(65) Prior Publication Data

US 2019/0020172 A1    Jan. 17, 2019

Related U.S. Application Data

(63) Continuation-in-part of application No. PCT/US2017/022102, filed on Mar. 13, 2017.

(Continued)

(51) Int. Cl.
*H01S 3/06*    (2006.01)
*H01S 3/11*    (2006.01)
(Continued)

(52) U.S. Cl.
CPC ......... *H01S 3/1115* (2013.01); *H01S 3/0612* (2013.01); *H01S 3/0625* (2013.01); *H01S 3/1615* (2013.01); *H01S 3/1623* (2013.01); *H01S 3/1625* (2013.01); *H01S 3/1636* (2013.01); *H01S 3/1643* (2013.01);
(Continued)

(58) Field of Classification Search
CPC .... H01S 3/0625; H01S 3/1636; H01S 3/1625; H01S 2301/02
See application file for complete search history.

(56) References Cited

U.S. PATENT DOCUMENTS 7,762,720 B1    7/2010  Zhu et al.
8,682,125 B2 *  3/2014  Bayramian ........... H01S 3/0612
                                                   385/123

(Continued)

FOREIGN PATENT DOCUMENTS

EP    1116965    7/2001

OTHER PUBLICATIONS

Huss, "Suppression of parasitic oscillations in a core-doped ceramic ND:YAG laser by Sm:YAG cladding," Jun. 7, 2010, Optics Express, vol. 18, No. 12, pp. 13094-13101. (Year: 2010).*

(Continued)

*Primary Examiner* — Michael Carter
(74) *Attorney, Agent, or Firm* — Klintworth & Rozenblat IP LLP; William Greener

(57) ABSTRACT

A solid-state laser amplifier includes a core material providing an active gain medium. A cladding material is on the core material that is the same material as the core material that further comprises a broadband absorber material. The cladding material suppresses transverse oscillations in solid-state, single-crystal or ceramic laser amplifiers by employing a native-material, solid-state, index-matched cladding containing an appropriate broadband absorber.

6 Claims, 2 Drawing Sheets

Related U.S. Application Data

(60) Provisional application No. 62/307,858, filed on Mar. 14, 2016.

(51) Int. Cl.
*H01S 3/23* (2006.01)
*H01S 3/16* (2006.01)

(52) U.S. Cl.
CPC ............ *H01S 3/2308* (2013.01); *H01S 3/061* (2013.01); *H01S 2301/02* (2013.01)

(56) References Cited

U.S. PATENT DOCUMENTS

| | | | | |
|---|---|---|---|---|
| 2008/0298407 | A1* | 12/2008 | Ikesue | C30B 1/12 372/41 |
| 2010/0296529 | A1* | 11/2010 | Andersen | H01S 3/067 372/6 |
| 2013/0188664 | A1* | 7/2013 | Xie | B82Y 20/00 372/107 |
| 2014/0079363 | A1 | 3/2014 | Hsu et al. | |

OTHER PUBLICATIONS

Wall, "Titanium Sapphire Lasers," 1990, The Lincoln Laboratory Journal, vol. 3, No. 3, pp. 447-462. (Year: 1990).*

A. Lupei, et al., "Spectroscopic Investigation of Sm3+ in Yag Ceramic", 2011, Romanian Reports in Physics, vol. 63, No. 3, pp. 817-722.

* cited by examiner

CLADDING MATERIAL FOR LASER AMPLIFIER TRANSVERSE OSCILLATION SUPPRESSION

RELATED APPLICATION DATA

This application is a continuation-in-part (CIP) application of PCT application number PCT/US2017/022102 entitled "LASER CLADDING MATERIAL, APPARATUS, AND METHODS FOR TRANSVERSE OSCILLATION SUPPRESSION" filed on Mar. 13, 2017, that claims the benefit of U.S. provisional application No. 62/307,858 filed Mar. 14, 2016, the subject matter of both being incorporated by reference herein in their entireties.

BACKGROUND

Ultra-high-intensity and ultra-fast laser pulses from laser amplifiers are essential requirements for high energy physics and National defense applications. Transverse parasitic lasing has however been up until now a bottleneck in Petawatt ($10^{15}$ watts) level Ti doped sapphire laser systems with large aperture gain crystals. A larger pumping areas leads to higher transverse gain experienced by radially-emitted spontaneous emission. If this gain becomes higher than the Fresnel losses experienced at the edge of the gain crystal, parasitic oscillations inside this transverse laser cavity will arise, depleting the population inversion and preventing desired amplifying action of the longitudinally-incident seed pulse. Besides, the thermal load from the higher pumping powers can degrade laser quality from an index gradient or lead to catastrophic damage to the gain crystals. Thus, generally either the power or repetition rate has to be limited, and special cryogenic cooling has to be applied.

The conventional procedure against parasitic laser generation is to reduce the reflectivity of the side wall of the gain crystals by coating them with a refractive index-matched absorptive polymer layer or liquids. These approaches however have various issues. For example, the absorptive polymer generally only has a matched index at one wavelength point and it has low thermal conductivity and different thermal expansion than the gain crystal.

SUMMARY

This Summary is provided to introduce a brief selection of disclosed concepts in a simplified form that are further described below in the Detailed Description including the drawings provided. This Summary is not intended to limit the claimed subject matter's scope. Aspects of an invention are defined in the appended independent claims.

Disclosed aspects provide a solution to the above-described laser amplifier problems by employing an absorptive solid-state cladding that is of the same material as the laser-grade core (i.e., gain crystal) of the laser amplifier (e.g. an alumina/sapphire cladding for a Ti:sapphire laser, or a Yttrium aluminium garnet (YAG) cladding for a Nd:YAG laser, etc.), but in a polycrystalline form. Therefore, the optical and thermal properties of the core and cladding are naturally matched. This solution overcomes many of the problems of existing index-matching claddings, which 1) may only approximate the gain medium's refractive index (or perhaps exactly match only at a single wavelength), 2) may not possess the same thermal properties of the gain medium (e.g.: the thermal conductivity, important for heat removal; the temperature-dependent changes in the refractive index, which could change the quality of index-matching at different temperatures; the thermal expansion coefficient, which can cause strain, cracking, or delamination of the crystal and cladding; etc.), and 3) may not be cryo- or vacuum-compatible.

By using a disclosed index-matching cladding made of the same material as the core of the gain medium 1) the refractive index of the cladding essentially matches that of the core for all wavelengths, which can be important for suppressing transverse oscillations across broad bandwidths, 2) the thermal properties of the cladding essentially match that of the core, which can be important for the functionality of transverse oscillation suppression in solid-state amplifiers regardless of the repetition rate, heat load, and operating temperature, and 3) the cladding itself is cryo- and vacuum-compatible. One disclosed aspect is a cladding material for a solid-state, single-crystal, or ceramic laser amplifier.

In an embodiment, the cladding material is the same material as a core material of the solid-state, single-crystal, or ceramic laser amplifier and includes a broadband absorber material. As used herein, a "broadband absorber material" means a crystalline, polycrystalline or composite material providing one or multiple strong resonant absorption bands whose spectral width is equal to or exceeds that of the spontaneous emission spectrum of the gain medium. Various non-limiting, exemplary embodiments may include one or more of the following limitations, features, components, characteristics or steps in various combinations as one skilled in the art would understand:

wherein the core material is sapphire and the cladding material is partially oxidized-titanium doped sapphire titanium doped sapphire and the cladding material comprises partially oxidized titanium-doped sapphire including $Ti^{4+}$ and $Ti^{3+}$, where the concentrations of $Ti^{4+}$ and $Ti^{3+}$ ions are within a factor of ten of each other.

wherein the core material is YAG and the cladding material is $Sm^{3+}$ doped YAG;

wherein the broadband absorber material is graphene;

wherein the graphene is in an amount of equal to or less than 50 atomic layers;

wherein the cladding material is in a polycrystalline form of the core material;

wherein the broadband absorber material is a rare earth ion, such as wherein the rare earth ion is $Sm^{3+}$;

wherein the broadband absorber material is transition metal ion, such as wherein the transition metal ion is $Cr^{4+}$;

wherein the broadband absorber material is a p-block element, such as wherein the p-block element is $Bi^{3+}$.

Another disclosed aspect is a method for suppressing transverse oscillations in a solid-state, single-crystal, or ceramic laser amplifier. The method can include applying a cladding material to an outer perimeter region of a core of the solid-state, single-crystal, or ceramic laser amplifier, wherein the cladding material is the same material as that of the core and includes a broadband absorber material. Various non-limiting, exemplary embodiments may include one or more of the following limitations, features, components, characteristics or steps in various combinations as one skilled in the art would understand:

comprising pressing or depositing the absorber doped ceramic powder on the core material and sintering to full density under a heat-treatment;

comprising in-diffusing the broadband absorber material at the periphery of the core through controlled thermal annealing in a reducing or an oxidizing atmosphere;

further comprising first coating the periphery of the core
material with a pigment and then heat-treating to promote the diffusion of the pigment through the outer
layer of the core material;
further comprising in-diffusing the broadband absorber
material through a controlled electrochemical process;
further comprising depositing pairs of ion-blocking/
electron-blocking electrodes and controlled potentiostatic electro-reduction or electro-oxidation of the
periphery of the core material under a controlled
atmosphere;
wherein the broadband absorber material is equal to or
less than 50 atomic layers of graphene.

BRIEF DESCRIPTION OF THE DRAWINGS

Reference will now be made to the accompanying drawings, which are not necessarily drawn to scale, wherein.

DETAILED DESCRIPTION

Figure 1:
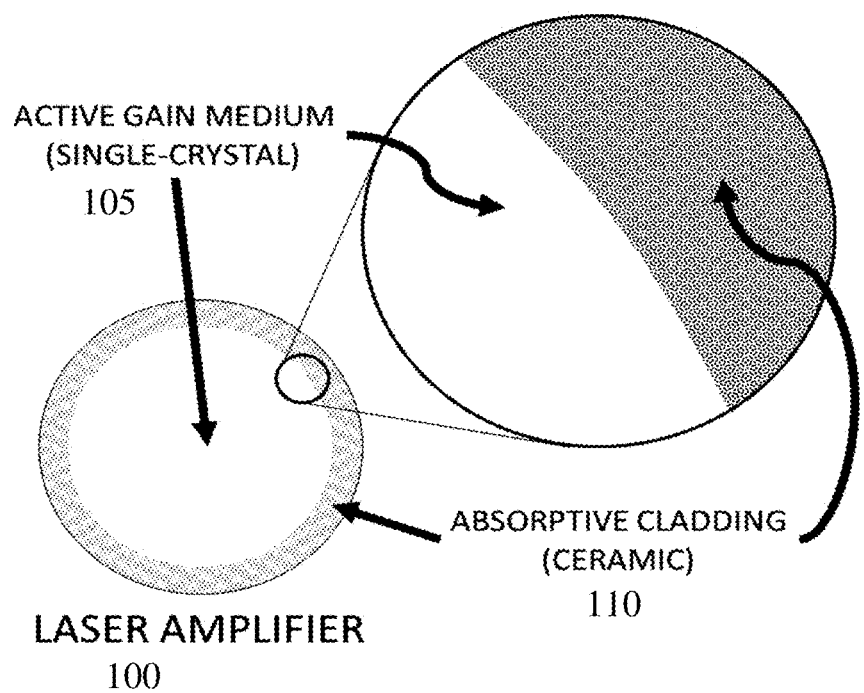
FIG. 1 shows a solid-state laser amplifier with an index-matching ceramic cladding on a core laser gain medium.

Example aspects are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Disclosed aspects include an absorptive, solid-state, index-matched cladding containing an appropriate broadband absorber for use in high power, solid-state, single-crystal or ceramic laser amplifiers to suppress transverse oscillations, and associated methods. The embodied cladding material can be the same material as the gain medium but in a polycrystalline form.

FIG. 1 shows a solid-state laser amplifier 100 comprising an index-matching ceramic cladding 110 shown as an "absorptive cladding (ceramic)" that is on a core 105 shown by example as being a single crystal material. The material for the cladding 110 can be a polycrystalline form of the same material for the core 105.

The core 105 typically comprises a rod (e.g., ~10 mm diameter, and a few cm in length), or slab (e.g., ~10 mm thick, and a few cm or tens of cm in length). However, the core 105 can be of any geometry, fibers included.

The cladding 110 can be in the form a coating that encapsulates the core 105 if the absorption coefficient ($\alpha$, in units of 1/cm) of the broadband absorber is sufficiently large (generally $\alpha>10$ 1/cm), such as in the case of the graphene embodiment. If a is not sufficiently large, the cladding 110 may be thicker, such as a few mm to a few cm, to allow for enough optical loss in the transverse modes.

Four example approaches are described below for cladding a core laser gain medium.
(i) using a rare-earth ion (e.g., $Sm^{3+}$), transition metal ion (e.g. $Cr^{4+}$), or p-block element (e.g., $Bi^{3+}$)-doped transparent/translucent ceramic for cladding a solid-state laser amplifier. Ceramic powders can be pressed or deposited on a gain-medium and then sintered under appropriate heat-treatments and turned into a fully dense and optically absorptive cladding. By using a ceramic cladding of the same material as the single-crystalline core but doped with a selected absorptive dopant (such as $Sm^{3+}$ in the case of a $Nd^{3+}$:YAG gain medium), the amplified spontaneous emission (ASE) of the core can be suppressed.

Figure 2:
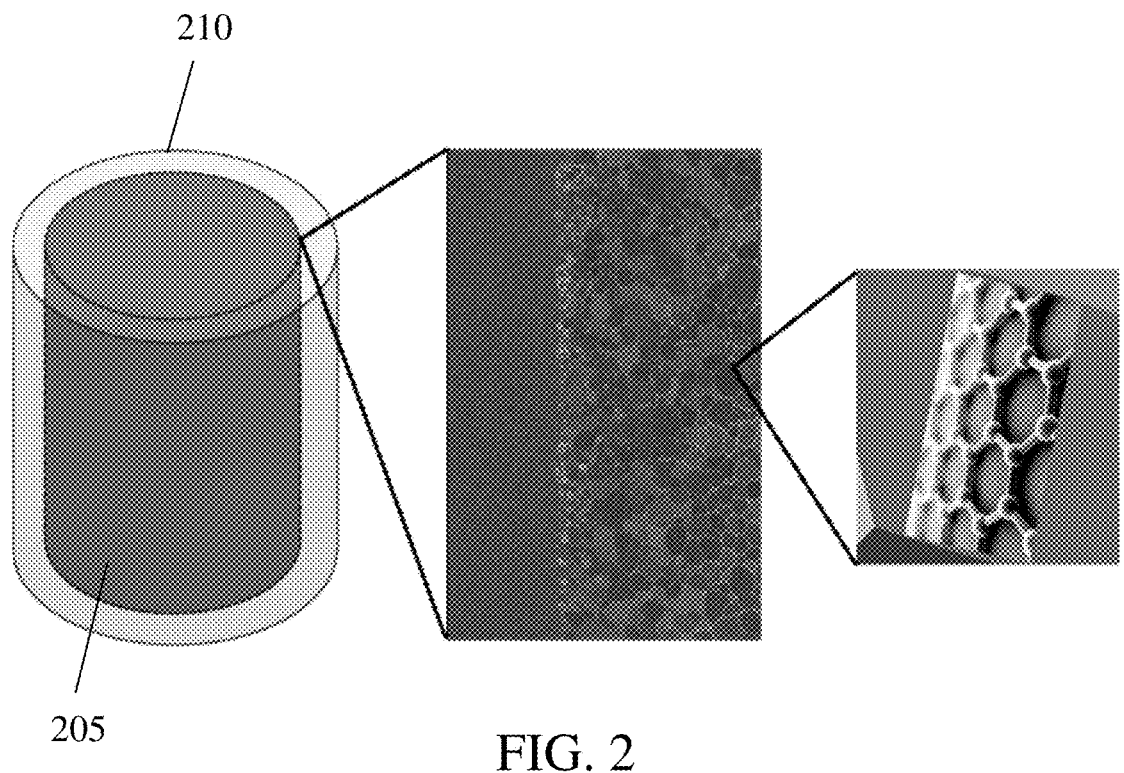
FIG. 2 is a schematic of a graphene doped ceramic cladding on a single crystal core (left), the interface between the cladding and core (center), and graphene on the grain boundary (right), according to an example embodiment.

FIG. 2 schematically shows a parts per million (ppm)-graphene-doped fully dense polycrystalline ceramic cladding 210 on a single crystal core 205 (left), the interface between the cladding and core (center), and graphene on the grain boundary (right). Here, a mixture of graphene and ceramic powders were pressed or deposited on the single crystal core 205 gain-medium and sintered to full density under appropriate heat-treatments. Monolayer graphene, a truly 2D gapless semiconductor, is found to absorb a significant ($\pi\alpha=2.3\%$) fraction of incident light. Less than 50 atomic layers of graphene can absorb essentially all the incident spontaneous emission.

Here, graphene or graphite nanoparticles (e.g., 100 ppm to 0.1% in weight) can be mixed with ceramic powders, then pressed or deposited on the single crystal core 205 gain-medium, then be sintered to full density under appropriate heat-treatments and turned into a fully dense and optically absorptive cladding. The thickness of the cladding can be varied from 0.1 to 10 mm, such as 1 mm to 10 mm depending on the mixing ratio of graphene or graphite in the ceramic powder. Too thick a cladding will impede heat removal from the core.

Generally, graphene or graphite are mixed with the ceramic powder in a planetary ball-mill with alumina grinding media and ethanol, while casting slurry is made with water, dispersants and binders. The carbon containing ceramic powder compact is typically sintered between 1600 and 1800° C. under high vacuum ($10^{-7}$ torr) into a dense ceramic solid and diffuse bond this solid onto the gain media core. FIG. 2 also shows the microstructure of the interface of ceramic cladding and single crystal gain media. Imaging on the two sides of this interface, materials have the same properties including refractive index, thermal expansion and conductivity, and transverse lights from core side will be absorbed when they pass the interface into the ceramic side, which contains the broadband absorbing graphene dispersed at grain boundaries.

Figure 3:
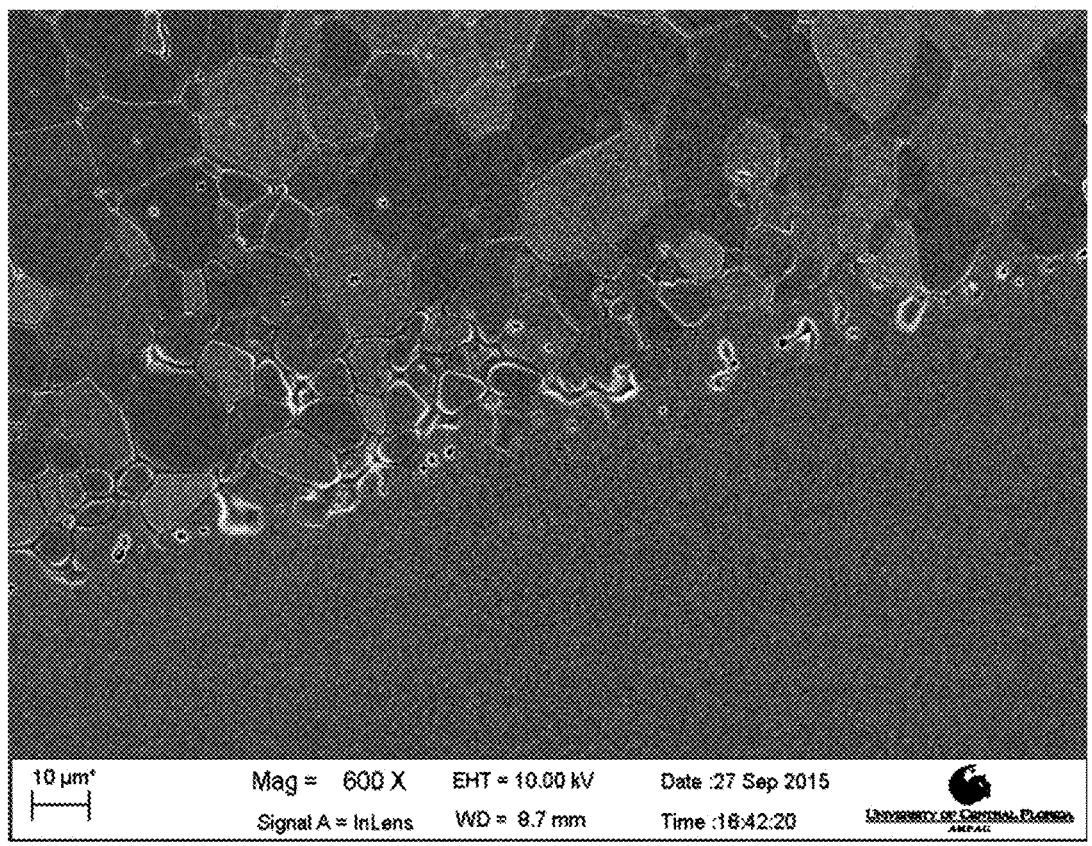
FIG. 3 is a scanned image showing an interface between a Ti doped sapphire single-crystal and a graphene-doped alumina ceramic cladding.

FIG. 3 is a scanned image showing an interface between a Ti doped sapphire single-crystal core and a graphene-doped alumina ceramic cladding.

In an alternative aspect, one can in-diffuse dopants or point-defects that have appropriate absorption bands at the periphery of the gain-medium through controlled thermal annealing in reducing or oxidizing atmospheres. Alternatively, the gain-medium can either be coated with a pigment and then heat-treated to promote the diffusion of the pigment through the outer layer of the gain-medium or simply heat-treated in a reducing or oxidizing environment of the wide absorption bandwidth of color centers created by in-diffusing dopants or point-defects that have appropriate absorption bands at the periphery of the gain-medium through controlled electrochemical processes.

One approach generally includes the preparation of varied solid load slurry with dopant and laser gain material particles mixed by, e.g., planetary ball milling, the wet forming of cladding structure on laser media core through dip coating, slip casting or gel casting depending on the required thickness of the cladding, calcination of organic dispersant, consolidation or single crystalline conversion of the cladding in different atmospheres and elevated temperatures, post-annealing, and optical polishing.

The electrochemical approach, also known as electrocoloration, involves the deposition of pairs of ion-blocking/electron-blocking electrodes and careful potentiostatic electro-reduction or electro-oxidation of the periphery of the gain-medium under controlled atmosphere. Examples of electrode stacks include platinum electrodes in contact with nickel-nickel oxide (Ni—NiO) or titanium suboxides (including $Ti_4O_7$, $Ti_5O_9$) ceramics on yttria-stabilized zirconia (YSZ). The experimental cell arrangements for the oxidation of Ti:sapphire gain media can be schematically represented by:

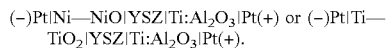

(−)Pt|Ni—NiO|YSZ|Ti:Al$_2$O$_3$|Pt(+) or (−)Pt|Ti—TiO$_2$|YSZ|Ti:Al$_2$O$_3$|Pt(+).

An external voltage is applied to the electrochemical cell, which when negative at the oxygen conducting electrode allows a current to pass and increase the concentration of oxygen ions in the outer layer of the gain medium (i.e. oxidize $Ti^{3+}$ into $Ti^{4+}$). Maximum optical absorption by charge transfer is obtained when the concentration of $Ti^{3+}$ equates that of $Ti^{4+}$. Ni—NiO is a mixed electronic-ionic conductor. $Y_2O_3$ stabilized zirconia is a well-known oxygen ion conductor and the two-layer electrode configuration blocks the electronic component of the current and allows only the flux of oxygen ions through alumina at temperatures of at least about 1000° C.

Advantages of using this type of cladding for solid-state laser amplifiers are numerous. Because this cladding is the same material as the core material, the index matching is naturally perfect across all wavelengths. For example, even if the crystalline orientations are random, the birefringence of sapphire is only ~0.008 throughout the near infrared, which still provides index matching similar or superior to fluids and thermoplastics as known in the art. Since the cladding is the same material as the core material, there are no worries about thermal expansion mismatching at the core-cladding interface, eliminating a major problem common to other solid-state index-matching solutions. The cladding material, such as alumina, has a higher thermal conductivity than other index-matching materials such as polymers, epoxies, and liquid-based solutions, making it easier to manage the thermal load of the gain medium. The cladding is stable, vacuum compatible, non-toxic, and easy to handle, unlike many thermoplastic and liquid-based index-matching options. The cladding is compatible with cryogenic cooling methods, unlike many thermoplastic and liquid-based index-matching options.

If liquid cooling is still desired, a clamp/seal can extend onto the face of the ceramic (where extra area is easy and cheap to grow) instead of onto the face of the single crystal (where extra area takes time and money). In liquid cooling, one must use single crystals larger than needed for amplification to provide necessary dead space around the edge of the face of the crystal for sealing the chilled liquid loop. This dead space could instead be part of the ceramic cladding, which would allow the use of a smaller (i.e., cheaper, higher-quality) crystal.

The ceramic nature of the embodied cladding provides several advantages of its own including freedom of doping, geometry, scaling, etc. The small powder grain size and the baking/growth process result in excellent optical contact between the core and the cladding, which can be a problem with other solid-state index-matching solutions.

The dopant graphene acts as a uniform broadband absorber across the visible and near IR spectrum. The disclosed cladding can be used for high-energy or high-power solid-state, single-crystal laser systems where thermal management and/or parasitic lasing is a concern.

An example commercial use for disclosed aspects is for high-power Ti:sapphire laser amplifiers. As an example, one manufacturer offers a PW-level Ti:sapphire laser amplifier with an anti-transverse-lasing solution but without the benefits of cryogenic cooling, while another offers a PW-level Ti:sapphire amplifier with cryogenic cooling but without the possibility of index matching. One could utilize disclosed index-matching claddings as part of a laser amplifier capable of offering the benefits of both cryogenic cooling and anti-transverse lasing. Additionally, disclosed aspects can be used to provide superior laser crystal products, or it can be applied to new and old crystals alike.

Those skilled in the art to which this Disclosure relates will appreciate that many other embodiments and variations of embodiments are possible within the scope of the claimed invention, and further additions, deletions, substitutions and modifications may be made to the described embodiments without departing from the scope of this Disclosure.

What is claimed is:

1. A method for suppressing transverse oscillations in a solid-state, single-crystal, or ceramic laser amplifier, comprising:
applying a cladding material to an outer perimeter region of a core of the solid-state, single-crystal, or ceramic laser amplifier,
wherein the cladding material is a same material as that of the core and includes a broadband absorber material, further comprising in-diffusing the broadband absorber material at the outer periphery of the core through a controlled electrochemical process.

2. The method of claim 1, comprising in-diffusing the broadband absorber material at a periphery of the core through controlled thermal annealing in a reducing or an oxidizing atmosphere.

3. The method of claim 2, further comprising first coating the periphery of the core with a pigment and then heat-treating to promote diffusion of the pigment through an outer layer of a core material.

4. The method of claim 1, further comprising depositing pairs of ion-blocking/electron-blocking electrodes and controlled potentiostatic electro-reduction or electro-oxidation of the periphery of the core material under a controlled atmosphere.

5. The method of claim 1, wherein the broadband absorber material is equal to or less than 50 atomic layers of graphene.

6. The method of claim 1, further comprising heat treating the gain medium in a reducing or oxidizing environment of the wide absorption bandwidth of color centers created by in-diffusing dopants or point-defects having appropriate absorption bands.

* * * * *